May 19, 1964  L. B. JOHNSTON  3,133,386
METHOD OF CONVEYING AND PROCESSING BODIES
Filed July 27, 1959  3 Sheets-Sheet 1
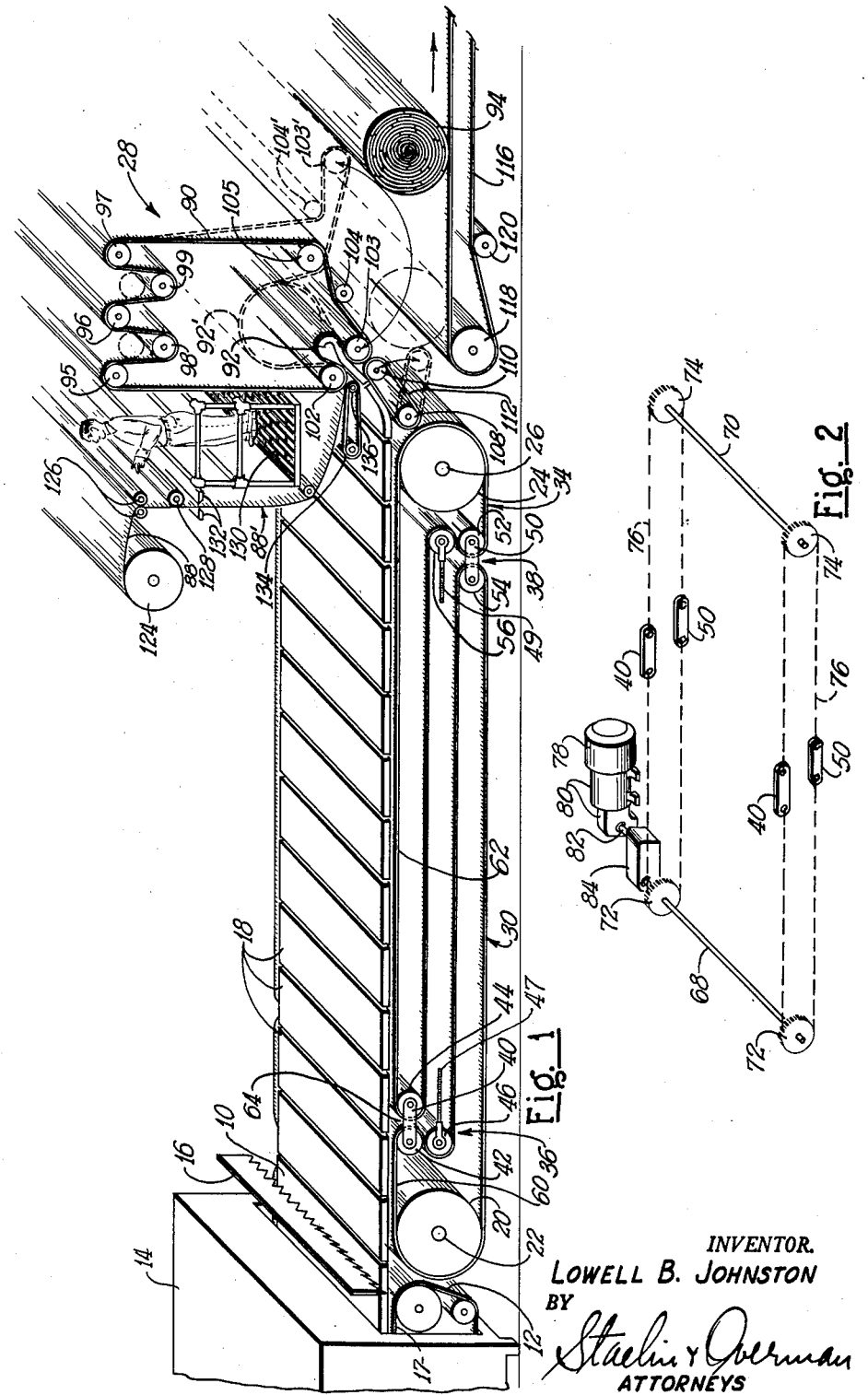
INVENTOR.
LOWELL B. JOHNSTON
BY
*Staelin & Overman*
ATTORNEYS May 19, 1964 L. B. JOHNSTON 3,133,386
METHOD OF CONVEYING AND PROCESSING BODIES
Filed July 27, 1959 3 Sheets-Sheet 2

INVENTOR.
LOWELL B. JOHNSTON
BY
ATTORNEYS

May 19, 1964  L. B. JOHNSTON  3,133,386
METHOD OF CONVEYING AND PROCESSING BODIES
Filed July 27, 1959  3 Sheets-Sheet 3
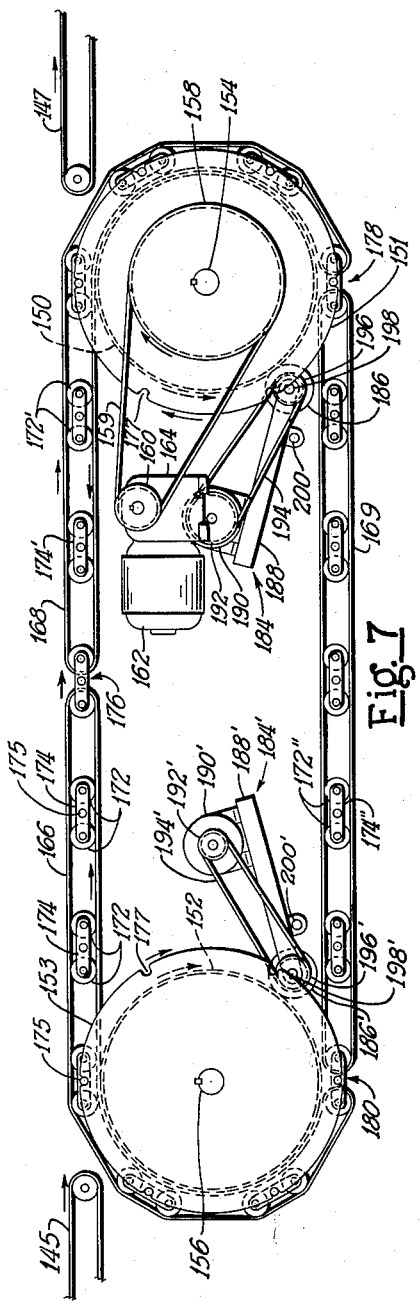
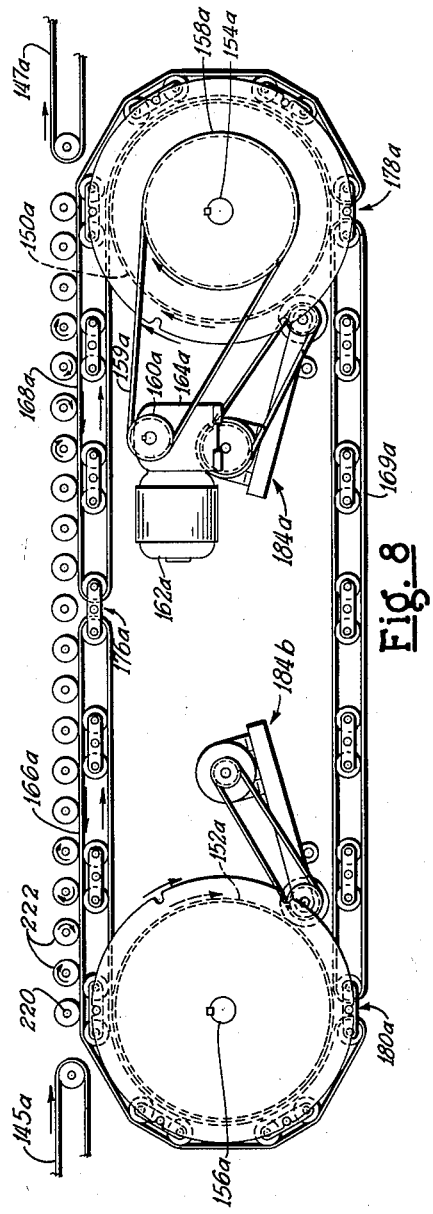
INVENTOR.
LOWELL B. JOHNSTON
BY
ATTORNEYS 3,133,386
METHOD OF CONVEYING AND PROCESSING BODIES
Lowell B. Johnston, Providence, R.I., assignor to Owens-Corning Fiberglas Corporation, a corporation of Delaware
Filed July 27, 1959, Ser. No. 829,899
3 Claims. (Cl. 53—26)

This invention relates to method of and arrangement for cycling movable surfaces or conveyor systems particularly adaptable for segregating and orienting bodies, articles or sections of materials for packaging or compacting the same or for facilitating processing, handling or transportation of bodies, articles or sections.

The invention has particular utility in segregating or orienting one or more articles, sections or groups of sections of material from a supply and for grouping the same in package formatoin, as for example, a batt or group of batts formed of fibrous material especially usable for insulation or sound attenuating purposes.

It has been a practice to advance a continuous strip or mat of fibrous material from a fiber collecting apparatus and sever finite lengths or sections from the continuous strip and roll up one or more lengths or sections with a strip of paper.

In roll packaging operations, the severed section or group of sections are rolled into package formation at the speed of advancement of the continuous strip or supply which is comparatively slow. It is found that in such method of processing, the low rate of linear travel of the section or sections being packaged is too slow to effectively compress the material to form a compact package, especially where fibrous material is compressed as it is packaged.

The present invention embraces a method of and apparatus for segregating or orienting an article or a plurality of articles, section or groups of sections of material from a continuous supply and advancing the segregated articles or sections or performing processing operations without impeding or interrupting the continuity or constant flow of the supply of material, articles or sections.

Another object of the invention embraces a method of cycling movable elements or conveyor systems having regions in adjacent but separated relation wherein the individual elements or systems may be operated or advanced at selected speeds and the relative position of the zone of separation between adjacent elements or systems changed or shifted independently of the movements or condition of the individual elements or systems.

Another object of the invention is the provision of a method of cycling movable surfaces or elements having regions in adjacent but separated relation wherein the surfaces or elements are adapted for performing operations or movements individually at selected rates or speeds and the regions of separation of the surfaces of elements are maintained fixed, advanced or retracted independently of the operations or movements of the respective surfaces or elements.

An object of the invention resides in a method of transferring articles from a moving supply whereby an article or group of articles is successively and automatically segregated or separated from the moving supply in order to advance the segregated or separated articles at a different speed relative to that of the supply to facilitate the carrying on of further operations on the segregated or separated articles.

Another object of the invention resides in a method of packaging articles or products which are continuously advanced from a supply involving the steps of transferring the articles or products from one moving conveyor system to a second moving conveyor system, controlling the speeds of the respective conveyor systems to isolate one or more articles or products from the supply and advance the isolated articles or products independently of the supply and vary or modify the respective positions of the systems to determine the number of articles or products isolated at each cycle of transfer thereof from one system to the other.

Another object of the invention is the provision of article transferring apparatus embodying two independently operable article engaging surfaces in combination with carriage means operatively connected with each transferring means movable to different positions for segregating selected quantities of articles from a supply and wherein the speed of each article engaging surface may be independently controlled to move the selected quantities of articles or perform operations thereon independently of the supply.

A further object of the invention is the provision of method and apparatus especially usable for successively packaging groups of bodies such as fibrous batts wherein batts from a supply are moved from one conveyor system onto another across a gap between the conveyor systems, the conveyor systems being arranged for movement to vary the position of the gap to predetermine the number of bodies in a group, each of the conveyor systems being independently operable whereby successive groups of bodies are advanced to a packaging station at a selected rate of speed.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an isometric semi-diagrammatic view illustrating a form of apparatus of the invention for carrying out or performing steps of the novel method;

FIGURE 2 is a semi-diagrammatic view illustrating a drive means for a trolley arrangement of the conveyor systems;

FIGURE 7 is a semi-diagrammatic elevational view of a modified arrangement of conveyors or conveyor systems;

FIGURE 8 is a semi-diagrammatic elevational view illustrating another arrangement of conveyors or conveyor systems of the invention.

Figure 3:
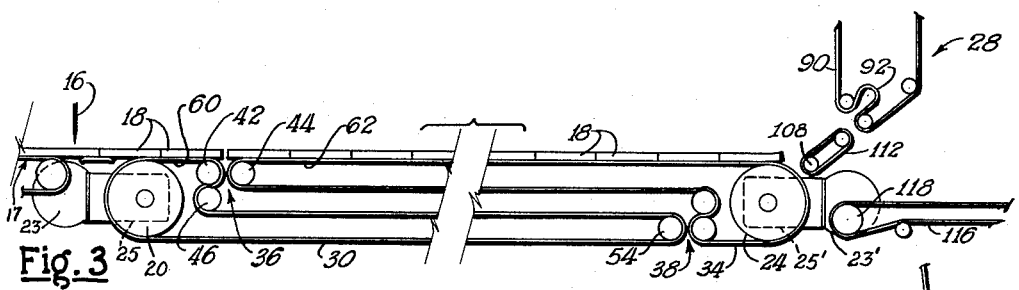
FIGURE 3 is a semi-diagrammatic elevational view of the conveyors or conveyor systems in their respective positions at the initial stage of a package forming operation.

While the forms of apparatus illustrated for carrying out the method of the invention are especially adapted for use in packaging or performing operations on sections or groups of sections of fibrous material, it is to be understood that the principles of the invention may be utilized in other forms of cycling operations of conveyor systems or movable elements or surfaces.

The invention has particular utility in segregating or performing operations upon groups of articles or for processing or advancing materials or articles where it is desired to segregate an article or group of articles from an advancing supply or is usable in conjunction with processing or manufacturing operations which require periodic interruption for work performing or manufacturing steps or an accelerating advancement of materials for material transition or transfer purposes.

In the forms of apparatus disclosed, the cycling of the conveyors or conveyor systems is carried on in a manner whereby the systems receive or accept a section or group of sections severed from a continuous strip or supply of fibrous material such as a mat of mineral fibers and convey the segregated section or group of sections or batts to a packaging station at which the section or group of sections is rolled into successive convolutions with a packaging web or sheet and such convoluted or rolled package completed and discharged from the packaging station automatically. The conveyors or conveyor systems are recycled to successively segregate sections or group of sections for transfer to the package forming station at an increased speed.

The arrangement illustrated in FIGURE 1 is inclusive of two independently operable conveyors or conveyor systems which may be driven at variable selected speeds, the conveyors or conveyor systems being connected to a trolley arrangement or system which, in the embodiment illustrated provides means for segregating, separating or isolating a severed section or group of sections or batts from a continuously advancing strip or layer of fibrous material as, for example, a mat of glass fibers.

With particular reference to FIGURE 1 a continuous strip or mat 10 of glass fibers or other fibrous material 10 is continuously advanced by an endless belt conveyor 12 in a right-hand direction as viewed in FIGURE 1 from a fiber collecting or processing station 14. The processing station 14 may be an arrangement for collecting fibers from fiber-forming apparatus into the mat or strip formation 10 or it may be a curing oven or station for curing or treating coating material or binder on the fibers of the strip 10.

Fibrous material and especially batts formed of glass fibers have particular utility as acoustic and heat insulation for incorporation in stoves, refrigerators and similar appliances or as an insulating medium installed in walls of buildings and other structures. It is therefore desirable to sever the continuous fibrous mat or strip into sections or batts of a dimension suitable for convenient application or installation.

A severing means, such as a vertically reciprocable knife 16, is arranged adjacent or near the terminus of the upper flight 17 of the endless belt conveyor 12, the operation of which is timed or programmed to sever the continuous mat 10 into sections. Arranged adjacent the terminus of the upper flight 17 of the conveyor 12 is a roll 20 supported upon a shaft 22 which is journaled in suitable bearings and driven by a motor 23, shown in FIGURE 3, of the variable speed type through a speed reducing means contained in a housing 25 for regulating or controlling the speed of rotation of the roll 20.

A second roll 24 mounted upon a shaft 26, driven by a motor 23' of the variable speed type through a speed reducing means contained in a housing 25', is spaced from the roll 20 and is arranged in parallelism therewith, the roll 24 being disposed adjacent a package forming or processing station 28. Associated with roll 20 is a movable member or conveyor 30 which takes over and engages the periphery of the roll 20 and is driven thereby.

A second conveyor 34 in the form of an endless belt, in the embodiment illustrated, takes over the periphery of the roll 24 in a manner to be driven thereby at a speed and a direction dependent upon the speed and direction of rotation of the roll 24. The conveyor or movable surface 30 and associated components constitute one conveyor system while the conveyor or movable surface 34 and associated components constitute another conveyor system. Each conveyor system is associated with movable carriage or trolley means, the trolleys being reciprocable in the region between the rolls 20 and 24 for purposes hereinafter explained.

One of the trolleys or movable carriages is illustrated at 36 and a second trolley is illustrated at 38. The trolley arrangement 36 includes a supplemental frame 40 arranged at each side of the severed sections 18, the frame members 40 being illustrated diagrammatically. Journally supported upon the frame members 40 is a first roll 42 and a second roll 44. Supported by members 47 adjustbly carried by the main frame construction is a third roll 46 which may be adjusted to maintain the first conveyor 30 in a taut or tensioned condition.

The second carriage or trolley 38 includes a similar supplemental frame 50 having components at opposite sides of the advancing sections of material, a first roll 52 being journaled on the carriage and a second roll 54 also journaled on the carriage 38. A tensioning roll or third roll 56 supported on the main frame by members 49 which are adjustable to render the second conveyor 34 in taut or tensioned condition.

In the arrangement shown in FIGURE 1 the first conveyor 30 extends around the large roll 20, this roll being the driving roll, around the first roll 42 supported on the carriage 40 thence around the third roll 46 and around the second roll 54 supported by the carriage or trolley 38. The second conveyor or conveyor system 34 extends around the driving roll 24, around the first roll 52 of the carriage 50, around the tensioning roll or third roll 56 thence around the second roll 44 of the carriage 40.

It will be seen that the conveyor or conveyor system 30 may be driven at a speed completely independently of the second conveyor or conveyor system 34 and the latter may likewise be driven at any speed independently of the first conveyor or conveyor system 30. It should be noted that the upper flight 60 of the first conveyor or conveyor system 30, which takes over the first roll of the carriage 36, and the upper flight 62 of the second conveyor system 34, which takes over the second roll 44 of the carriage 36, are preferably arranged in a single plane which, in the embodiment illustrated, is substantially horizontal.

The flights 60 and 62 of the conveyors are therefore adapted to support the severed sections 18 during transfer of the sections or batts to the package forming or other processing station 28. Through the provision of the trolley arrangement 36 the adjacent regions of the flights 60 and 62 are slightly separated and form a region or gap 64 which is herein referred to as a slot which is utilized to separate or segregate a severed section or group of sections from the advancing supply.

The segregated section or group of sections are advanced over the gap or slot 64 onto the upper flight 62 of the second conveyor system 34 and the speed thereof increased in effecting delivery of the discrete section or group of sections to the package roll-up or forming station 28. FIGURE 2 illustrates semi-diagrammatically means for driving or reciprocating the trolleys or carriages 36 and 38.

The trolley actuating or driving means is inclusive of spaced shafts 68 and 70, the shaft 68 adapted to be disposed adjacent the roll 20 and in parallelism therewith, while the shaft 70 is adapted to be positioned adjacent the roll 24 and in parallelism therewith. The shafts 68 and 70 are journaled in suitable bearings carried by a frame construction (not shown). Mounted upon the shaft 68 is a pair of toothed sprockets 72, the sprockets being arranged at opposite sides of the conveyor 60. The shaft 70 is provided with a pair of sprockets 74, the sprockets 74 being disposed adjacent opposite sides of the conveyor 62.

The sprockets 72 and 74 of each pair are connected together by means of endless chains 76 illustrated schematically in broken lines in FIGURE 2. The upper flights of each of the chains 76 is connected to one of the frame members 40 of the trolley arrangement 36 while the lower flights of the endless chains 76 are connected with the frame members 50 of the trolley mechanism or carriage 38. The shaft 68 is driven by a reversible electrically energizable motor 78 through a variable speed reduction mechanism contained within a housing 80, the output shaft 82 from the speed reducing mechanisms in the housings 80 and 84.

The speed changing mechanism in the housing 84 is connected with and adapted to drive the shaft 68 for reciprocating the chains 76 in one direction or the other depending upon the direction of rotation of the reversible motor 78. Through the provision of the driving means illustrated in FIGURE 2 for the trolley mechanisms or carriages 36 and 38, the movement of one trolley mechanism in one direction is exactly equal to the movement of the other trolley mechanism in the opposite direction.

Reciprocatory movements of the trolley mechanisms do not affect the linear travel of either of the conveyor flights 60 and 62 which are independent of one another and may be driven at individually selected speeds to advance the discrete sections or groups of sections or articles on the conveyors 60 and 62. The purpose of establishing the conveyor system 34 independent of the conveyor system 30 is to enable the segregation and accumulation of one or more sections or group of sections on the conveyor flight 62 whereby the segregated or separated sections may be advanced to the roll forming or other processing station 28 at a speed greater than the speed of the conveyor flight 60.

In the arrangement illustrated in FIGURE 1, a group of sections 18 are adapted to be advanced at an increased speed over that of the conveyor 60 to a roll package forming station 28 at which station the group of sections 18 is rolled into successive convolutions together with a wrapping sheet or web 88, the latter being paper, cloth or other suitable packaging or covering material.

In the embodiment illustrated in the drawings, the package forming apparatus or system includes an endless belt 90 which is supported in a manner so as to pay out a loop formation 92 in which an isolated group of sections 18 and the web or sheet 88 are rolled into successive convolutions to form a generally cylindrically shaped package, a finished package being illustrated at 94. The endless belt 90 is supported by three rolls 95, 96 and 97 which, in the embodiment illustrated, are arranged in horizontally-spaced parallel relation.

Disposed between rolls 95 and 96 is a roll 98 and disposed between the rolls 96 and 97 is a roll 99, the rolls 98 and 99 being arranged whereby the weight of these rolls sets up or establishes tension maintaining the package forming belt 90 in a taut condition. The belt 90, adjacent the package forming region or zone, takes over or engages rolls 102, 103, 104 and 105.

The rolls 102 and 105 are journaled for rotation in a frame structure and their relative position remains unchanged during package forming operations. The rolls 103 and 104 are mounted upon a supplemental frame (not shown) pivotally supported for movement about the axis of the roll 105 whereby rolls 103 and 104 are movable from a package forming position to a package discharge position, the latter position being shown in broken lines in FIGURE 1.

The supplemental frame carrying the rollers 103 and 104 and movable about the axis of the roll 105 may be actuated or swung to its alternate positions by suitable means (not shown). Disposed adjacent the roll 24 is a roll 108 which is journally supported for rotation, the roll being driven by a motor (not shown) or other suitable means. Spaced from the roll 108 is a roll 110 which is rotatably journaled in a supplemental frame (not shown) mounted for pivotal movement about the axis of the roll 108. The rolls 108 and 110 support an endless belt conveyor 112 which is inclined as shown in FIGURE 1 forming a movable ramp for guiding a section or group of sections of material to be packaged into the package forming loop 92.

As shown in FIGURE 1, the upper flight or surface of the conveyor 112 engages and advances the sections as they are moved in a right-hand direction by the conveyor or conveyor system 62. The frame (not shown) supporting the roll 110 is adapted for pivotal movement to move the roll 110 to the broken line position shown in FIGURE 1 to facilitate discharge of a completed package 94 from the package forming loop 92. An endless belt 116 engages a relatively stationary rotatable roll 118 which is disposed beneath the package discharge region whereby a completed package is deposited upon the upper flight of the conveyor 116.

The conveyor 116 is driven by suitable means (not shown) to carry the completed packages away from the package forming station. The belt 116 is engaged by an idler roll 120 biased into contact with the belt for maintaining the belt in a tensioned condition. The web or paper, adapted to be rolled up with the sections, is obtained from a supply roll 124.

The method of packaging includes the steps of periodically advancing the web or sheet of paper a distance required for covering a package formed in the loop 92, applying glue to the web and severing the web to the desired length. As shown in FIGURE 1, pull or nip rolls 126 are driven by suitable means to periodically advance the web or sheet 88 from the supply roll 124. The web passes a glue applying station which is inclusive of a glue applying roll 128. The glue may be supplied to the roll 128 by well known conventional means.

The glue roll is preferably arranged to apply spaced linear areas of glue onto the lengthwise moving web 88. The controls (not shown) for the various drive means are disposed within and adjacent an operator's platform 130 for convenience of the operator. Disposed adjacent the glue station is a pair of web or sheet severing knives or means 132 adapted to be actuated periodically to sever a strip section 88' from the advancing continuous web or strip 88. The severed web or strip 88' is maintained in a position to be advanced or fed to the rolled package as an overwrap by a shield or guide member (not shown).

The section of web or wrapping sheet 88' is advanced at the proper time into the package forming loop 92 by means of a feeding device 134 which, in the embodiment illustrated, is an endless belt of flexible material to obtain the traction desired to advance the web for overwrapping the package formed in the loop 92. In the embodiment illustrated, a forward roll 136 is arranged adjacent the roll 102 so that the web section 88' is fed to the package by frictional engagement with the belt 90 and the feed belt 134.

The method of operation of the form of the invention illustrated in FIGURE 1 as utilized for segregating and advancing successive groups of segregated articles as, for example, severed sections of fibrous batts and packaging or otherwise processing the successive groups of articles is as follows:

A continuous mat 10 of fibrous material is continuously advanced preferably at a constant speed by the conveyor 17 onto the upper flight 60 of the endless conveyor 30 which is associated with the trolleys or carriages 36 and 38. The conveyor or conveyor system 30 is driven by the roll 20 rotated by a motor 23 controlled to advance the upper flight 60 of the belt 30 at a linear speed substantially the same as that of the conveyor 17. In the embodiment illustrated, the severing means 16 is intermittently operated to sever the successive sections or batts 18 from the advancing mat 10.

The endless conveyor or conveyor system 34 is of the same character as the conveyor 30 and is disposed with its upper flight 62 arranged to receive and accommodate the severed sections 18 which are advanced over the gap or slot 64 between the conveyors. The roll 24, adapted for driving the conveyor 34, is controlled so that the upper flights 60 and 62 of conveyors 30 and 34 are advanced at the same surface speed during accumulation of a group of batts on flight 62 so that there is no relative movement between successive batts being moved by the conveyor flights.

The trolleys or carriages 36 and 38, during the period of accumulation of a group of batts on the flight 62 of the second conveyor, are relatively stationary and in the approximate positions illustrated in FIGURES 1 and 3.

When a desired number of batts has been accumulated on the flight 62 of the conveyor 34, which is to be advanced as a segregated group to the packaging station or other processing station 28, the speed of the conveyor 34 is increased to deliver the group of batts 18 on the flight 62 to the packaging station at a substantially increased speed as compared with the linear speed of the conveyor flight 60.

It is found that a group of batts is packaged more satisfactorily into a roll-type package by moving them rapidly to the package forming loop 92 provided by the belt 90. Thus as the group of batts on the conveyor flight 62, segregated or isolated from those on the flight 60 by the gap or slot 64 in hte trolley 36, are rapidly moved into the package forming loop, the motor 78, shown in FIGURE 2, is energized in a direction and at a speed to reciprocate the trolleys 36 and 38 in opposite directions, the trolley 36 being moved in a right-hand direction as viewed in FIGURE 1 at a speed substantially that of the linear speed of the belt 62.

Through this method, the gap or slot 64 between the flights 60 and 62 of the conveyors is advanced as the isolated group of batts is rapidly conveyed to the packaging station so as to provide additional area of the upper flight 60 of conveyor 30 to receive advancing mat sections 18 delivered by the continuously moving supply conveyor 17. The isolated group of batts 18 is rapidly advanced into the loop 92 of the packaging forming belt 90 by the increased speed of the flight 62.

The advancing group of batts on the flight 62 is projected in successive convolutions within the loop 92 of the belt 90, and the loop 92 is progressively engaged by the batts and enlarged thereby until the loop in the belt receives and accommodates the batts of the group forming a completed roll package and at the completion of the package occupies the region indicated by broken lines at 92'.

At the start of the formation of a roll package at the packaging station a web or strip of paper 88' is advanced simultaneously by the rolling action of the batts being fed into the loop 92. Glue is applied by the applicator 128 to a region of the strip 88' and the strip severed from the supply 88 by the knives 132.

Figure 4:
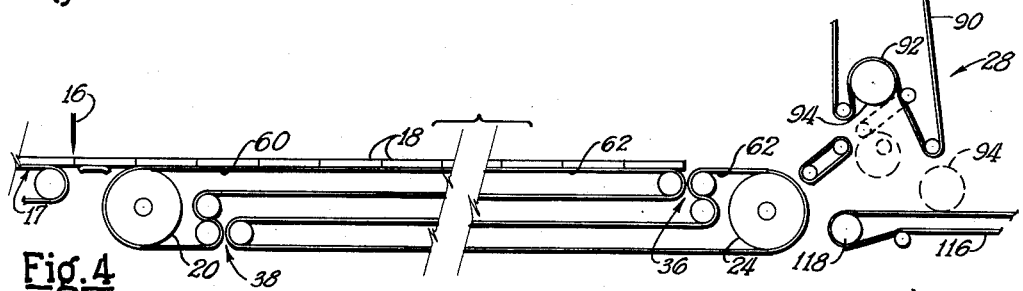
FIGURE 4 is a view similar to FIGURE 3 showing the conveyors or conveyor systems at the moment of completion and discharge of a completed package from the package forming station.

At the completion of the packaging of the group of batts and wrapping strip 88' in the loop 92, the frame structure (not shown) carrying the rolls 103 and 104 is swung in a counter-clockwise direction, as viewed in FIGURE 1, about the axis of the roll 105 wherein the rolls 103 and 104 are positioned as shown in broken lines at 103' and 104' and the roll 110 and ramp belt 112 moved to the broken line position whereby the completed package in the loop 92 is doffed or discharged from the roll forming station onto the receiving conveyor 116, a completed package being shown at 94 in FIGURES 1 and 4.

The conveyor 116 is driven to convey the completed package away from the roll forming station. When the group of isolated or segregated batts 18 has been delivered by the conveyor 34 moving at its increased speed into the roll forming loop, the speed of the conveyor flight 62 is reduced to the same speed as the conveyor flight 60. This is accomplished by regulating the speed of the driving means for the roll 24.

Figure 5:
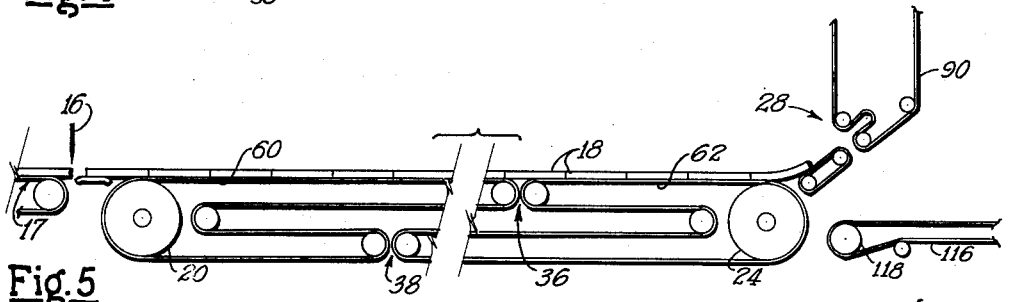
FIGURE 5 is a view similar to FIGURE 3 showing the conveyors or conveyor systems and the position of trolley means connecting the conveyors or conveyor systems during movement of the trolley means toward an initial or package forming start-up position.
Figure 6:
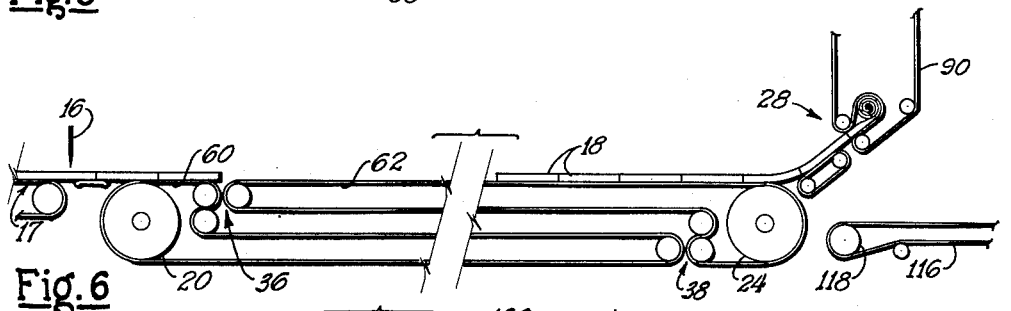
FIGURE 6 is a view similar to FIGURE 3 illustrating the segregated group of fibrous sections advancing into the package forming station.
Figure 9:
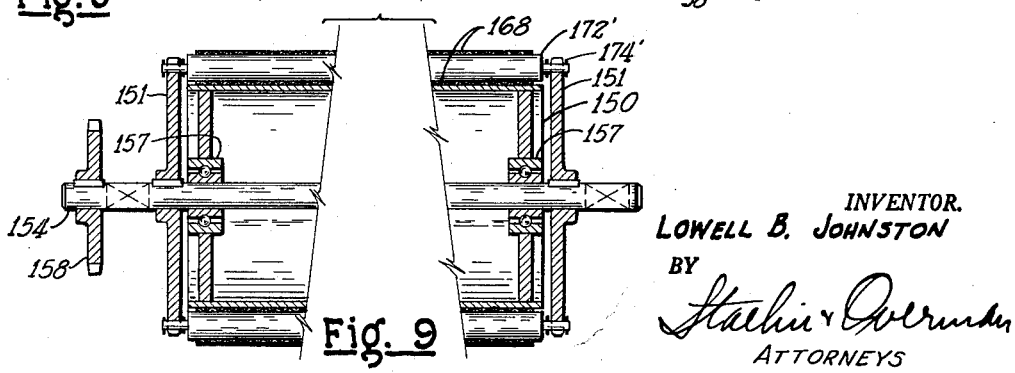
FIGURE 9 is a transverse sectional view of the conveyor arrangement and supporting means therefor shown in FIGURE 7.

After the conveyor flight 62 is brought to the same speed as conveyor flight 60, both moving in a right-hand direction as viewed in FIGURE 1, the motor 78 shown in FIGURE 2 is energized and rotated in the opposite direction to actuate the chains 76 to move the trolleys or carriages 36 and 38 in opposite directions from their positions as shown in FIGURE 4 to their initial position as shown in FIGURE 6. FIGURE 5 illustrates the positions of the carriages during their retractive movements toward their initial positions.

As the conveyor flights 60 and 62 are moving in a right-hand direction at the same speed during retraction of the trolley 36 toward its initial position shown in FIGURES 1 and 3, the advancing batts 18 are moved in a right-hand direction as viewed in FIGURE 1 and are transferred from the conveyor flight 60 onto the conveyor flight 62 during the retractive movement of the carriage 36 without any relative movement between any of the batts 18 and the conveyor flight 62, as the latter is progressively moved beneath the advancing batts.

When a predetermined desired number of advancing batts 18 from the supply conveyor 17 is accumulated on the conveyor flight 62 as a succeeding group, the speed of the conveyor flight 62 is again increased in speed by changing the speed of the driving means for the roll 24 to rapidly deliver the succeeding group of batts to the receiving station or roll forming station provided by the loop 92 and the other steps hereinbefore described carried on or performed sequentially in the manner above described.

The method of the invention enables the isolation or segregation of a predetermined number of articles or sections from a continuous flow of such articles or sections and the handling of an isolated group thereof by a means or system independently of the continuous flow of the articles or sections from a supply and to package a group or otherwise convey the group to a processing station without interrupting the continuity of supply.

Furthermore, the method enables the complete control of the relative positions and rates of movements of adjacent, but independent, conveyor systems whereby one or a plurality of articles, items or sections may be segregated and isolated for subsequent packaging or processing operations as may be desired. The relatively movable carriages 36 and 38 render these results possible by providing a selectively positionable gap region or slot between adjacent conveyors or systems and the exercise of independent speed control for both conveyor systems.

FIGURE 7 illustrates a modified form of conveyor system and apparatus for carrying out a modified method of the invention. With particular reference to FIGURE 7, 145 illustrates an article feeding or supply conveyor of the endless belt type for conveying or delivering articles to the conveyor systems. A second conveyor 147 is disposed to receive an article or group of articles segregated by the conveyor systems from continuously advancing supply of articles.

The conveyor systems for segregating articles and moving the segregated articles at selected speeds includes conveyor supporting drums or revoluble members 150 and 152, respectively supported upon shafts 154 and 156, the shafts being journally supported in suitable bearings mounted by a frame structure (not shown). Each of the drums is journaled in bearings 157 mounted on the supporting shaft for rotation independently thereof. One of the shafts, for example, shaft 154 is driven by suitable means. As illustrated diagrammatically in FIGURE 7, the shaft 154 is provided with a sprocket 158 which is connected by means of a drive chain 159 with a driving sprocket 160.

The drive sprocket is driven by a motor 162 through suitable gear reduction mechanism (not shown) contained within a housing 164 associated with the motor 162. The gear reducing mechanism within the housing 164 is of the variable speed type and may be adjusted or controlled to advance the conveyor systems at a selected or desired speed. The revoluble members or drums 150 and 152 support multiple conveyor systems or multiple conveyors arranged to receive articles advanced by the conveyor 145 and transfer segregated or isolated groups of articles to the receiving conveyor 147 at selected speeds.

In the embodiment illustrated in FIGURE 7, there are three interconnected, yet independently operable conveyor arrangements or systems. The conveyor systems include independent conveyors 166, 168 and 169, each conveyor being of the endless belt type. The conveyor 166 is supported on a plurality of rolls 172 arranged in pairs, each pair being mounted upon a carrier or supplemental frame 174. The carriers 174 have projections 175 which engage in recesses 177 of drive members or sprocket plates 151 and 153 which are driven by shafts 154 and 156 for advancing the carriers and the conveyors.

The conveyor 168 is supported by pairs of rolls 172' mounted by carriers 174' and the third conveyor 169 is supported by pairs of rolls 172", each pair of rolls being mounted on carrier 174". These carriers are provided with projections 175 for cooperation with the driving plates 151 and 153. In the form shown in FIGURE 7, there are three trolleys or carriages 176, 178 and 180, each carriage being arranged to engage two of the endless belt conveyors to maintain adjacent regions thereof in spaced relation to form gaps or slots between adjacent regions of the pairs of conveyors.

In this form of the invention, the conveyors are moved in paths whereby their upper flights are substantially in the plane of the article supply conveyor 145. Individual driving means independent of the driving plates or sprockets 151 and 153 is provided for each of the drums 150 and 152 for selectively driving the conveyors individually at desired speeds for accumulating groups of articles on the conveyors and advance a group of articles away from the advancing supply of articles.

Disposed adjacent the revoluble drum or member 150 is a conveyor driving means 184 which includes a driving roll 186 journally mounted upon a frame structure 188 supporting a drive motor 190. The motor shaft is equipped with a drive pulley 192 connected by means of a driving belt 194 with a driven pulley 196 which is secured to a shaft 198 upon which the drive roll 186 is mounted. The drive roll 186 is coextensive in a transverse direction with the width of the drum 150 and frictionally engages the drum to drive a conveyor as the conveyors successively move into engagement with the drum 150. The frame 188 is pivotally supported intermediate its ends by a shaft 200 whereby the weight of the motor 190 biases the conveyor drive roll 186 in frictional driving relation with the drum 150. The motor 190 is of a variable speed type for controlling or changing the rate of movement or advancement of the conveyor with which the driving means is engaged and is rotated to advance the upper flight of the conveyor with which it is engaged in a right-hand direction as viewed in FIGURE 7.

A similar independent drive means 184' is provided for driving the drum 152. This drive means includes a driving roll 186' carried by a frame structure 188' supporting a drive motor 190'. A motor driven pulley 192' is connected by a belt 194' with a driven pulley 196' secured on shaft 198' to drive the roll 186' and drum 152 in frictional drive engagement with the roll 186'. The motor 190' is also of the variable speed type for controlling the rate of linear speed of a conveyor in engagement therewith. In the embodiment illustrated, each of the conveyors or conveyor systems 166, 168 and 169 are of identical construction and length.

The operation of the arrangement shown in FIGURE 7 is as follows: The supply conveyor 145 is operated to continuously advance batts or articles onto the upper flight of conveyor 166 with the carriage 176 adjacent the supporting roll or means 152. The conveyors are simultaneously moved by the driving motor 162 through the plates 151 and 153 engaging the carriers 174, 174', 174" and trolleys 176, 178 and 180, and this movement advances the upper flight of conveyor 166 at the same linear speed as that of the conveyor 145 so that the articles or batts are received upon the conveyor 166 without any relative slippage between the articles or batts and the conveyor. The drum 152 is driven by the motor 190' at a speed to maintain the rate of movement of the upper flight of conveyor 166 the same as the rate of delivery of the articles or batts from conveyor 145. The upper flight of the conveyor 168 is moved independently of the other conveyors in a right-hand direction by the drive roll 186 at an increased linear speed to advance articles accumulated thereon onto the receiving conveyor 147. During advancement of the conveyor 166 at the same speed as that of the feed conveyor 145, the articles or batts are moved onto the conveyor 166 and accumulate thereon until the conveyor 166 is engaged in its traverse by the drive roll 150. When this drive is thus established, the conveyor 166 may be advanced, independently of the conveyors 168 and 169 at an increased speed and the group of articles or batts collected on the conveyor 166 between the trolleys 176 and 180 are delivered rapidly onto the receiving conveyor 147 or other means such as the arrangement shown in FIGURE 1 for conveying the articles or batts to a packaging or processing station.

The same action and conveying operation obtains with respect to each succeeding conveyor, and each of the individual conveyor belts or systems is adapted to accumulated a predetermined number of articles or batts forming segregated groups provided by the gaps at the trolleys 176, 178 and 180, each succeeding group being advanced by an individual conveyor through the driving means 184 to rapidly deliver the articles or batts to a packaging station or other receiving means.

FIGURE 8 illustrates a modified form of the arrangement shown in FIGURE 7. In this arrangement the conveyors 166a, 168a and 169a are of the same construction as the corresponding components shown in FIGURE 7. The driving motor 162a, the conveyor supporting and drive members 150a and 152a and the individual conveyor drive means 184a and 184b are the same as the corresponding components shown in FIGURE 7.

In this form of the invention, the endless belts or conveyors 166a, 168a and 169a do not directly support the articles or batts but the conveyors are adapted to rotate a plurality of rollers or individual roller conveyors which are adapted to engage, support and advance the articles or batts.

Disposed above the upper flights of the endless belt conveyors in their uppermost positions is a frame construction (not shown) provided with a plurality of transversely extending shafts 220, each of the shafts supporting a freely rotatable roller 222, each of the rollers being successively engaged by the endless belt conveyors arranged for frictionally driving or rotating the rollers to advance the articles or batts supported thereby.

The arrangement shown in FIGURE 8 is likewise provided with trolleys or carriages 176a, 178a and 180a whereby a number or group of articles or batts may be segregated or isolated on a group of the rolls 222 driven by an adjacent driving belt or conveyor. Thus the group of rolls 222 at the left side of the trolley 176a may be rotated at one speed through contact with the endless belt 166a, while the group of rolls 222 at the right-hand side of the gap provided by the trolley 176a is driven at an increased speed through the driving means 184a.

In the form shown in FIGURE 8, the driving means 150a and 152a advance the conveyors and the carriers therefor at a desired speed such as the linear speed of the batt supplying conveyor 145a with the exception of the individual conveyor which is in contact with the drive means 184a.

It will be seen that the conveyor 168a is adapted to be individually advanced by the driving roll 186a at an increased speed whereby the rolls 222 at the right-hand side of the gap provided by the trolley 176a are rotated at an increased speed to rapidly advance the batts onto the receiving conveyor 147a, while the batts from the supply are delivered onto the rolls 222 at the left side of the trolley 176a at the same linear speed as the supply conveyor 145a. When the conveyor assembly is moved by the rolls 150a and 152a to a position to engage the driving belt or conveyor 166a with the driving roll 150a, the speed of the driving belt or conveyor 166a is increased by the drive means 184a and the segregated group of articles or batts disposed on the rolls 222 between the gaps provided by the trolleys 176a and 180a are rapidly delivered onto the receiving conveyor 147a.

This cycle or sequence of operations takes place with each group segregated upon the rolls 222 in a region between pairs of the trolleys and the segregated groups successively delivered to a packaging station or receiving conveyor 147a by the increased rotational speed of the rollers through contact of the drive roll 150a with the belt conveyor in engagement therewith. Through this method, group of articles may be segregated from a continuous supply and advanced at a different speed without interrupting the continuity or rate of feed of the supply.

It is apparent that, within the scope of the invention, modifications and different arrangements may be made other than as herein disclosed, and the present disclosure is illustrative merely, the invention comprehending all variations thereof.

I claim:

1. The method of segregating articles from an advancing flow of articles including establishing dual conveyors maintained in spaced relation by connectors, advancing one conveyor at a predetermined speed, advancing the second conveyor at the same speed to concomitantly advance articles onto both conveyors, increasing the speed of the second conveyor to isolate on the second conveyor a group of articles in abutting relation from the advancing flow of articles, intermittently advancing the position of the connectors of the conveyors to accommodate receipt of succeeding articles, delivering the isolated articles from the second conveyor moving at increased speed, reducing the speed of the second conveyor relative to that of the first conveyor, and varying the extent of movement of the connectors for determining the number of articles in a group collected on the second conveyor for delivery as a group therefrom.

2. The method of intermittently segregating articles from an advancing flow of articles including advancing individual multiple conveyors with slots between adjacent regions of the conveyors, advancing one conveyor at a speed at which articles are received thereon from a supply, transferring a group of successively arranged articles in abutting relation from a first conveyor to a second conveyor while said conveyors are advancing at substantially the same speed until a predetermined number of articles comprising a group are supported on said second conveyor and the group separated by the slot between successive conveyors, increasing the speed of the second conveyor to deliver the separated group of articles to a receiving station, advancing the position of the slot between adjacent conveyors independently of the movement of the conveyors and in the direction of movement of the group of isolated articles to establish a region of the succeeding conveyor to receive a group of articles from the advancing flow of articles, and moving the conveyors to shift the slots to their initial positions after the separated group of articles has been delivered to the receiving station.

3. The method of intermittently segregating batts of mineral fibers from an advancing supply and conveying the segregated groups of batts to a packaging station including advancing individual conveyors having trolleys between adjacent conveyors, advancing a first conveyor at a speed at which batts are received thereon from a supply, transferring the advancing batts in abutting relation from a first conveyor to a second conveyor while said conveyors are advancing at substantially the same speed until a predetermined number of batts in abutting relation are supported on said second conveyor and isolated by a region of separation provided by the trolley between the first and second conveyors, increasing the speed of the second conveyor to deliver the isolated group of batts thereon to the batt packaging station, advancing the trolleys to move a flight region of the first conveyor in a position to receive batts in abutting relation from the supply, and moving the trolleys to their initial positions to establish a succeeding group of batts in abutting relation on the second conveyor.

References Cited in the file of this patent

UNITED STATES PATENTS

| | | |
|---|---|---|
| 1,212,011 | Brugmann | Jan. 9, 1917 |
| 1,285,489 | Walker | Nov. 19, 1918 |
| 1,736,517 | Baker | Nov. 19, 1929 |
| 2,661,707 | Clement | Dec. 8, 1953 |
| 2,670,836 | Ball | Mar. 2, 1954 |
| 2,789,406 | Mosier | Apr. 23, 1957 |
| 2,805,755 | Jones | Sept. 10, 1957 |